United States Patent [19]

Sibrava

[11] 3,991,975

[45] Nov. 16, 1976

[54] ROTARY PLUG VALVE WITH NOTCHED SEALING RING GROOVE

[75] Inventor: Joseph S. Sibrava, Berwyn, Ill.

[73] Assignee: Mueller Co., Decatur, Ill.

[22] Filed: July 8, 1975

[21] Appl. No.: 593,982

[52] U.S. Cl. .......................... 251/317; 251/DIG. 1; 251/309; 251/312; 251/357

[51] Int. Cl.[2] .......................... F16K 5/04

[58] Field of Search .......... 251/314, 316, 317, 209, 251/309, DIG. 1, 357, 358, 310, 311, 312

[56] References Cited

UNITED STATES PATENTS

| | | | |
|---|---|---|---|
| 2,433,732 | 12/1947 | Brown | 251/175 |
| 2,493,966 | 1/1950 | Hartley | 251/312 |
| 2,497,448 | 2/1950 | Grosboll | 251/309 |
| 2,510,514 | 6/1950 | Mueller | 251/317 |
| 2,547,116 | 4/1951 | Gould | 251/309 |
| 2,547,831 | 4/1951 | Mueller | 251/309 |
| 2,604,293 | 7/1952 | Phillips | 251/175 |
| 2,850,041 | 9/1958 | Radanof | 251/310 |
| 3,480,042 | 11/1969 | Mueller et al. | 277/71 |
| 3,484,078 | 12/1969 | Haenky | 251/317 |
| 3,883,113 | 5/1975 | Kolb | 251/209 |

FOREIGN PATENTS OR APPLICATIONS

| | | | |
|---|---|---|---|
| 1,382,117 | 7/1963 | France | 251/DIG. 1 |

*Primary Examiner*—William R. Cline
*Assistant Examiner*—H. Jay Spiegel
*Attorney, Agent, or Firm*—Cushman, Darby & Cushman

[57] ABSTRACT

A rotary plug valve having a plug member rotatable in a valve housing member between an open position and a closed position, the plug member carrying a sealing ring, such as an O-ring seal or the like, in a groove provided on its surface between its port openings, the O-ring seal being adapted to encircle one of the ports of the housing member when the plug member is in the closed position. The rotary plug valve is capable of two-way flow therethrough, and this is realized by providing means for equalizing the pressure across the unsupported portion or segment of the O-ring seal when the same is passing across one of the ports of the valve housing. By such an arrangement, the pressure across the O-ring seal may be equalized in certain situations such as when the plug member is rotated towards and approaches a position for closing the valve and when the plug member is rotated towards and approaches the full open position and this prevents clipping or shearing of the O-ring seal. This particular arrangement of pressure equalizing means for the O-ring seal of the rotary plug valve makes the valve capable of two-way flow in that it may be inserted into a fluid pressure line so that the O-ring seal surrounds the upstream port of the housing member when in closed position, or the downstream port of the housing member when in closed position.

22 Claims, 15 Drawing Figures

Fig. 5.
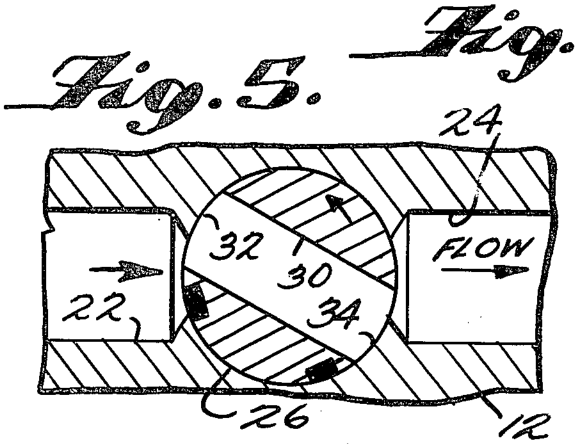
Fig. 6.
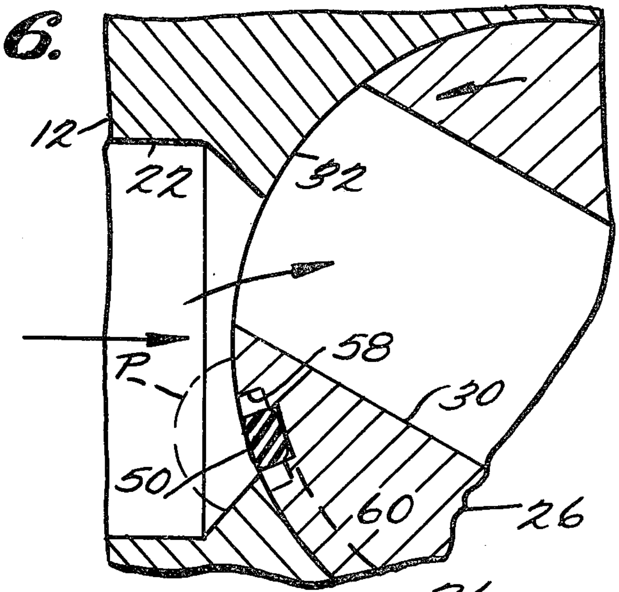
Fig. 7.
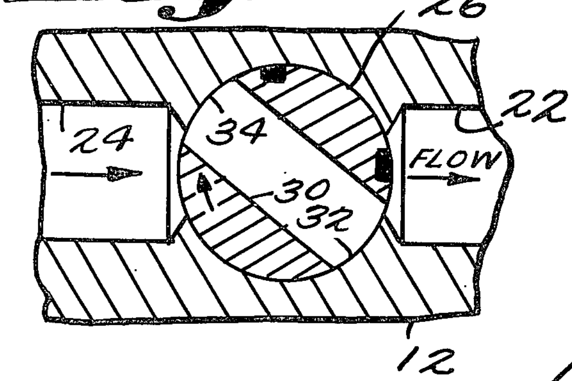
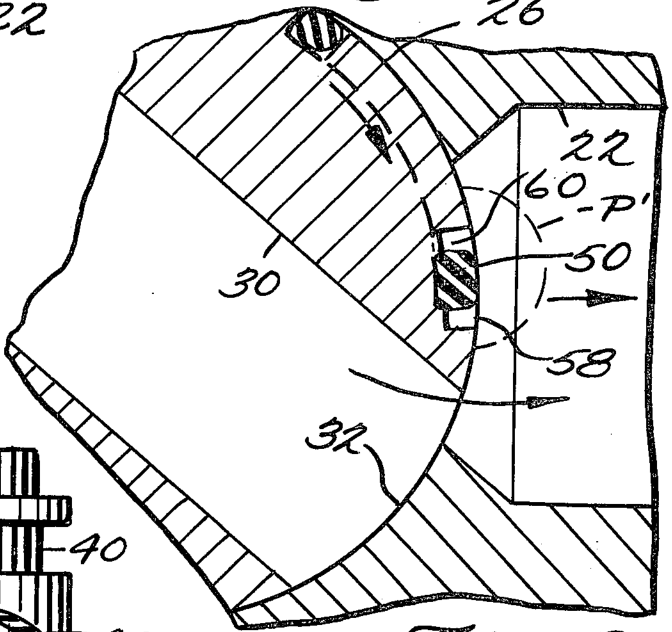
Fig. 8.
Fig. 9.
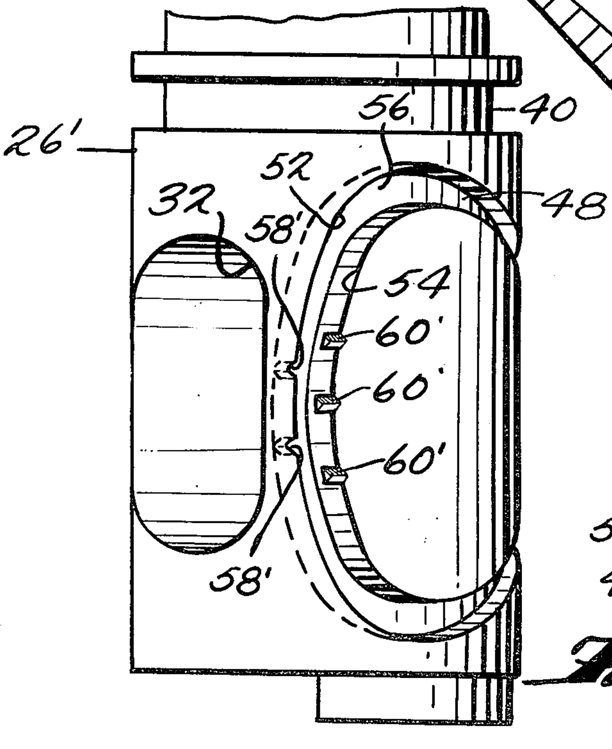
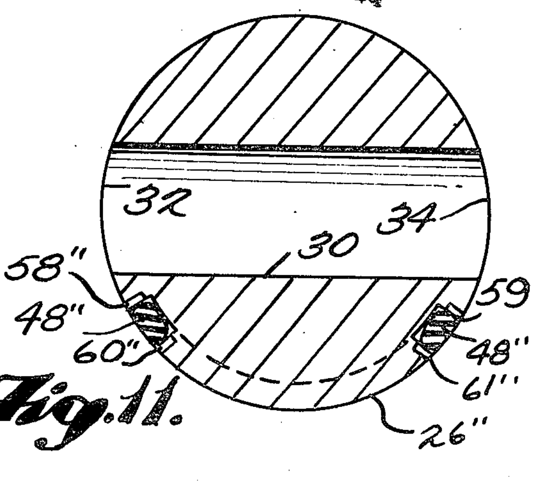
Fig. 11.

Fig. 14.
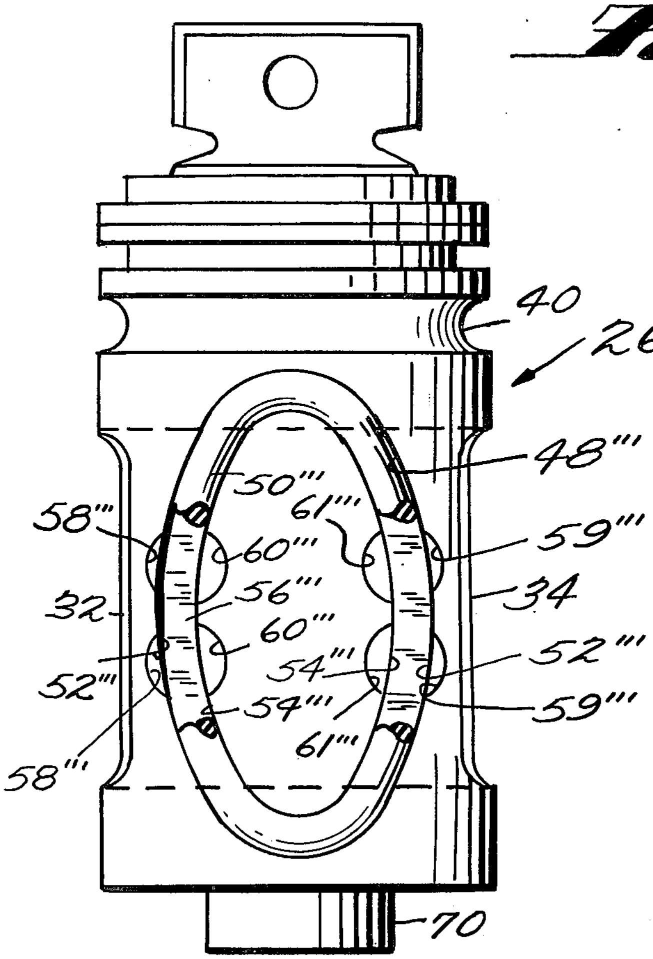
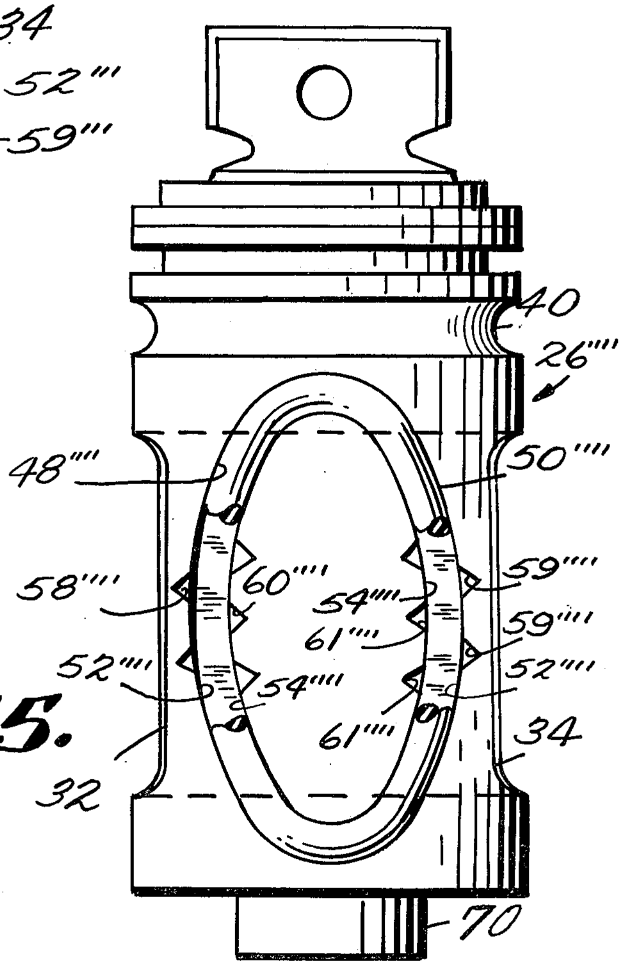
Fig. 15.

ROTARY PLUG VALVE WITH NOTCHED SEALING RING GROOVE

The present invention relates to improvements in rotary plug valves or the like which are provided with a sealing ring on the surface plug member arranged to encircle one of the ports of the valve housing member when the plug member is moved to a position to fully close the valve. More particularly, the present invention relates to an improvement in such valves wherein the sealing ring may be positioned on the surface of the plug member and may encircle either the upstream port of the valve housing member or the downstream port of the valve housing member when the valve is in the closed position and, thus, the valve is effectively a two-way valve in that fluid through the valve may be in either direction without affecting the sealing ring during operation to cause the same to clip when either opening or closing the valve.

BACKGROUND OF THE INVENTION

For many years, sealing rings such as 0-ring seals or the like, have been provided in rotary plug valves for sealing off the fluid when the valve is moved to the closed position. When the sealing ring is provided in a groove in the valve seat of the housing member rather than on the plug member, the groove is usually provided around the outlet or downstream port of the housing member. It was the feeling that by positioning such a sealing ring around the downstream port of the housing member, the pressure of the fluid passing through the valve tended to hold the sealing ring in its groove when the valve was being operated between the open and closed positions. However, this type of arrangement has not been too satisfactory for commercial use as it has proved costly to manufacture such a rotary plug valve since it was difficult to machine the groove for the sealing ring in the housing member. Also if the valve was inadvertently installed into a fluid line so that the sealing ring in the housing member was around the upstream or inlet port of the housing member, then the valve operated unsatisfactory because the flow through the valve when the valve was being opened and closed caused the sealing ring to be drawn out of its groove and to be clipped when the port openings of the plug member passed by the same.

Since it is far more desirable to provide a sealing ring in a groove on the plug member of the rotary plug valve because the manufacture of the rotary plug valve is simplified and is less costly, there has been a trend over the past years to provide such a groove for the sealing ring on the plug member between its port openings rather than in the valve seat of the valve housing member. In theory, it was originally believed that the sealing ring must surround the inlet port when the valve was in the closed position and the sealing ring was carried by the plug. The pressure of the fluid in the line during opening and closing of the valve was felt to be sufficient to hold the sealing ring in its groove on the plug. However, it has been found that this arrangement is not necessarily foolproof and there was still clipping of sealing rings as the valves approached full open position. Additionally, this type of rotary plug valve had the disadvantage in that it could not be a two-way valve and if by chance the valve was inserted into the fluid pressure line in the wrong way so that the sealing ring surrounded the downstream port of the valve housing member when the valve was closed, the differential pressure across the sealing ring as a portion or segment of the same passed the downstream port of the valve housing member during closing caused the sealing ring to be lifted from its groove and a clipping of the ring resulted.

In an effort to improve the rotary plug valves, various means have been used in the past to try to retain the sealing rings in their grooves both when the groove is provided around one of the ports in the valve housing member as well as on the surface of the plug member between the plug member's port openings. In this respect, rotary plug valves for high-pressure fluid distribution systems have been designed with special means for trying to equalize the pressure across the sealing ring, to maintain the sealing ring in its groove, or means have been provided which will guide the sealing ring back into its groove as the plug member is being rotated between the open and closed positions of the valve. The various arrangements heretofore provided all had the disadvantage in that while they did help maintain the O-ring seal in its groove for a particular flow situation, the rotary plug valve was not capable of two-way flow. In this respect, depending upon the location of the sealing ring, there was always a situation in which the sealing ring would not function correctly in all conditions of flow, whether forward flow through the valve or reverse flow through the valve, and consequently, undesirable clipping of the sealing ring could occur.

The problem of sealing ring clipping or shearing in rotary plug valves has been a constant source of trouble in the industry and a solution had to be found so that the rotary plug valves would be completely servicable for flow in both directions and could operate without the sealing ring ever being clipped. The solution to this problem which resulted in the present invention will appear later in the specification under the heading "BRIEF SUMMARY OF THE INVENTION" as well as under the heading "DETAILED SUMMARY OF THE INVENTION."

Prior arrangements relating to but not suggesting the present invention are disclosed in the following United States Patents:

| Number | Name | Date |
|---|---|---|
| 2,433,732 | C. A. Brown | Dec. 30, 1947 |
| 2,510,514 | F. H. Mueller | June 6, 1950 |
| 2,547,116 | W. E. Gould | April 3, 1951 |
| 2,547,831 | F. H. Mueller | April 3, 1951 |
| 2,604,293 | D. L. Phillips | July 22, 1952 |
| 3,480,042 | F. H. Mueller et al. | Nov. 25, 1969 |

While the above listed patents disclose various arrangements of rotary plug valves which are provided with means for attempting to prevent the sealing ring of the plug valve from being clipped during opening or closing of the plug valve, none of these patents suggest an arrangement which completely eliminates the problem of clipping of a sealing ring in a rotary plug valve regardless of the installation of the plug valve in a fluid pressure distribution system nor do the patents disclose an arrangement which provides utility to a rotary plug valve for flow through the valve in either direction.

BRIEF SUMMARY OF THE INVENTION

The present invention is an improvement in rotary plug valves having one sealing ring mounted in a groove on the surface of the plug, the plug valve being capable of having fluid flow therethrough in either direction without the possibility of clipping or shearing of the O-ring upon opening or closing of the valve. In this respect, the sealing ring is mounted in a groove on the surface of the plug member between the port openings of the same and is capable of operating to close the valve by surrounding either the upstream or inlet port of the valve housing member or the downstream or outlet port of the valve housing member.

When the sealing ring on the plug member operates to surround the upstream or inlet port of the housing member when the valve is closed, there are several forces working on the O-ring seal which tend to retain it in its groove as the plug is rotated. One force is due to the upstream pressure of the fluid of the inlet line acting directly on the exposed surface of the segment or portion of the sealing ring exposed to the inlet port in the housing member with this force tending to keep the 0-ring seal in its groove. A second force, tending to keep the O-ring seal in its groove as the plug of the valve is rotated is the friction of the walls of the groove on the sealing ring, while a third force, also tending to keep the sealing ring in its groove is the bending resistance of the sealing ring itself. With regard to the third force relating to bending resistance of the sealing ring, it will be understood that the segment or portion of the sealing ring, which is exposed to the inlet port of the valve housing, is in effect a beam. The harder or stiffer the material from which the sealing ring is made, the stronger and more resistant to bending is the beam and this tends to retain the sealing ring in the groove.

While the sealing ring tends to be retained in its groove on closing when the sealing ring is arranged to surround the inlet port of the housing, the same is not true when the valve is opened. In this case, as the portion or segment of the sealing ring exposed to the inlet port approaches the edge of the inlet port upon opening, the flow of fluid through the valve creates a low pressure surrounding the exterior or exposed portion of the sealing ring and since there is a higher pressure beneath the sealing ring in the groove, a differential pressure is created across the sealing ring which tends to produce a resultant force acting in a direction to lift the sealing ring from its groove. To avoid such a condition, the differential pressure across the sealing ring must be reduced or equalized.

Considering the same valve as described and a condition where the flow through the valve is such that when the valve is closed, the sealing ring in a groove on the surface of the plug member surrounds the downstream or outlet port of the valve housing member, a different situation occurs with regard to a clipping or shearing of the sealing ring. In this latter mentioned arrangement, the factors heretofore mentioned which tend to keep the sealing ring in its groove as a portion or segment of the same moves across the downstream or outlet port are the same, except that in this situation, there is no inlet line pressure acting directly on the exposed surface of the O-ring seal. In this situation, there are only two forces tending to keep the sealing ring in its groove as it moves across the downstream port, namely the friction of the walls of the groove on the sealing ring and the bending resistance of the sealing ring itself.

If the flow through the valve is such that the sealing ring, when the valve is closed, is surrounding the downstream or outlet port of the valve housing, the situation with respect to the portion or segment of the sealing ring crossing the downstream or outlet port during opening and closing differs than in the case where the sealing ring surrounds the inlet port when the valve is closed. Unlike the latter situation, the portion or segment of the sealing ring crossing the downstream or outlet port tends to be lifted from the groove in the plug when the valve is closed. Thus, when the valve is approaching the full-closed position, the flow of fluid through the valve creates a low pressure area around the exposed portion of the sealing ring and like in the former situation this low pressure is less than the pressure beneath the sealing ring in the groove and consequently a pressure differential is created which tends to lift the sealing ring out of the groove. In order to prevent the valve from having its sealing ring clipped upon closing, the pressure across the sealing ring must be reduced or equalized so that the sealing ring will remain in its groove on the plug member.

In the broadest aspects of the present invention a rotary plug valve is provided with a housing member having a valve seat with at least a first port and a second port, and a plug member rotatable in the valve seat, and having a flow passage therethrough with at least a first port opening and a second port opening, the plug member being rotatable between a fully open position and a fully closed position. The plug member has an endless groove on its surface between the first and second port openings of the same, and a resilient sealing ring is carried in the groove and arranged to encircle and form a seal around at least one of the first and second ports of the housing member when the plug is in the closed position. Means are provided in the outer wall of the groove for equalizing the pressure across the sealing ring as the sealing ring passes across at least one of the ports in the housing member when this port is an inlet port and the plug member approaches the fully opened position. A second means is provided in the inner wall of the groove for equalizing the pressure across the sealing ring as the sealing ring passes across one of the ports in the housing member when this port is an outlet port and the plug member is approaching the fully closed position.

The present invention contemplates utilizing at least one notch extending from the surface of the plug member in the outer wall preferably to a distance no greater than the bottom wall of the groove as the means for equalizing pressure across the sealing ring when the plug member is being moved to the open position and at least one notch extending from the surface of the plug member in the inner wall preferably to a distance no greater than the bottom wall of the groove as the means for equalizing the pressure across the sealing ring when the plug member is being moved to the closed position.

Additionally, the present invention contemplates providing means to limit rotation of the plug member between the fully opened and the fully closed position with the notches in the outer wall and inner wall being on a side of the groove which crosses one of the ports in the valve housing member and, thus, the valve is capable of use as a two-way flow valve.

Still further, the present invention contemplates a rotary valve in which the plug member is checkless and the plug member may rotate 360° and in this arrangement notches are provided in the inner and outer walls of the groove on each side of the groove so that regardless of rotation of the plug member of the valve in a fluid pressure line, there are notches provided in the proper position to equalize pressure across the sealing ring as it is moving across one of the ports of the housing member from open to closed position and from closed to open position.

Other objects and advantages of the present invention will appear more fully from a review of the drawings and from the "DETAILED DESCRIPTION OF THE INVENTION" which will follow.

BRIEF DESCRIPTION OF THE DRAWINGS

FIG. 5 is a horizontal sectional view through the plug member and a portion of the housing member of the valve of FIG. 1 with the plug member being moved toward the fully opened position from a closed position wherein the sealing ring encircled a port of the housing member acting as the inlet port.

FIG. 6 is an enlarged fragmentary view of a portion of FIG. 5.

FIG. 7 is a horizontal sectional view similar to FIG. 5 but showing the plug member being moved to a closed position where the sealing ring surrounds or encircles a port of the valve housing member which is acting as a downstream or outlet port.

FIG. 8 is an enlarged fragmentary sectional view of a portion of FIG. 7.

FIG. 9 discloses an elevational view of a modified form of plug member for use with the valve of FIG. 1.

FIG. 11 is a sectional view of the plug member of FIG. 10 taken on the line 11—11 of FIG. 10.

FIG. 14 discloses an elevational view similar to FIG. 10 but of a further modified plug member for use in a checkless rotary plug valve, the view illustrating a plurality of notches in each of the outer and inner walls of the groove for the sealing ring.

FIG. 15 discloses an elevational view similar to FIG. 10 but of another modified plug member for use in a checkless rotary plug valve, the view illustrating notches in the outer and inner walls which are V-shaped in cross section.

DETAILED DESCRIPTION OF THE INVENTION

Figure 1:
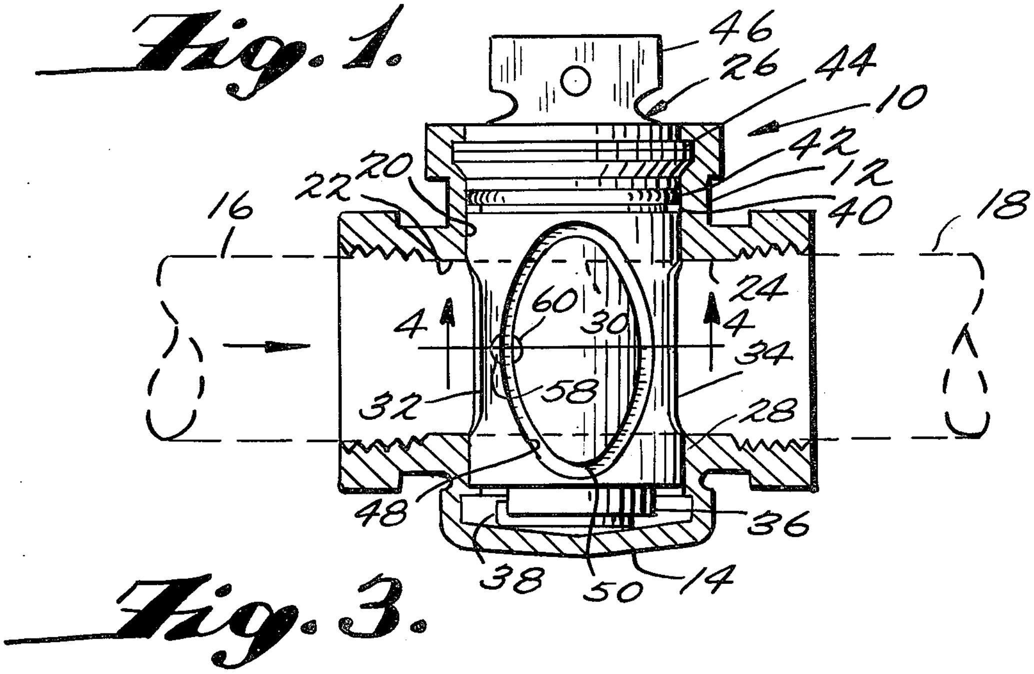
FIG. 1 is a vertical sectional view of a rotary plug valve incorporating the present invention, the plug member of the valve and the sealing ring being shown in elevation and the valve being shown in the fully open position.

Referring now to the drawings wherein like characters or reference numerals represent like or similar parts, and, in particular to FIGS. 1 through 8 inclusive, there is shown a rotary plug valve of the present invention generally designated by the numeral 10. The plug valve 10 comprises a housing member 12 with an integral closed bottom 14, the housing member being suitably connected to an upstream pipe 16 shown in broken lines and extending to a source of fluid pressure, such as a water main or the like, and a downstream pipe 18 also shown in broken lines and extending to a place of use, such as a dwelling or the like. The housing member 12 is provided with a cylindrically-shaped valve seat 20 of uniform diameter and having diametrically opposed ports 22 and 24 respectively which may act as inlet or outlet ports depending upon installation in lines.

Rotatably mounted in the valve seat 20 is a valve key or valve plug member generally designated by the numeral 26, the plug member having an exterior cylindrical surface 28 of uniform diameter and slightly smaller diameter than that of the valve seat 20 and co-extensive therewith. While the plug member 26 and the valve seat 20 of the housing member 12 are disclosed as cylindrical, it will be appreciated by those skilled in the art that the plug member and valve seat could be of the tapered type or, for that matter, the plug member could be of the ball type with the valve seat spherically-shaped.

Also, it will be understood that while the rotary plug valve is disclosed as a simple two-port plug valve, it will be understood by those skilled in the art, the invention could be used with a multi-port plug valve having three or more ports with the flow passage in the plug member being arranged to align with at least two of the ports in various open conditions of the valve.

The plug member 26 has a flow passage 30 therethrough with port openings 32 and 34. The port openings 32 and 34 are arranged to register with the ports 22 and 24 when the rotary plug valve 10 is in the fully-opened position and to be out of register with such ports when the valve is in the fully-closed position. In order that the valve can only be rotated between a fully-opened and fully-closed position, the plug member 26 is provided at its lower end with an arcuate check lug 36 which cooperates with an arcuate flange 38 formed integrally on the closed bottom 14 of the housing member 12. The check lug 36 and flange 38 cooperate as a means for limiting rotation of the plug member 26 in the order of 90° and, thus, it will be realized the plug member can only be rotated between a first position where the valve is fully-opened and the flow passage 30 is in alignment with the ports 22 and 24 of the housing member 12 and a second position where the valve is fully-closed and the flow passage in the plug member is out of registration with such ports of the housing member. Any other suitable means for restricting rotation in the order of 90° in the opened and closed positions may be utilized especially where the valve housing member is not of the closed bottom type as shown.

The upper portion of the plug member 26 is provided with a circumferential groove 40 of uniform depth on its surface, the groove 40 being arranged to receive a sealing ring 42 such as an O-ring seal, which cooperates with the valve seat 20 to prevent fluid such as water from leaking outwardly from the valve seat 20 and the plug member 26 when the plug member is in either the opened position or the closed position while the sealing ring for cooperating with the ports in the valve housing member, to be described later, surrounds the port 22 of the housing member 12 when such port is acting as an upstream port.

Retainer means generally designated at 44, which may include a thrust washer assembly and a split retaining ring, is provided for retaining the plug member 26 axially within the housing member 12. Such a retainer means is shown in U.S. Pat. No. 3,350,057, issued Oct. 31, 1967 to Lawrence F. Luckenbill, or U.S. Pat. No. 3,349,799, issued Oct. 31, 1967 to Frank H. Mueller and William L. Hauffe, both patents being assigned to the same assignee as this case and for this purpose these patents are incorporated herein by reference. The plug member 26 is provided at its upper end with a reduced portion extending outward of the housing member 12 and terminating on a flat non-circular head 46, the head being capable of receiving a wrench or handle for operation of the valve.

An endless groove 48 of uniform depth and substantially rectangular cross section is provided on the exterior surface 28 of the plug member 26 intermediate the port openings 32 and 34, the groove being arranged on the side of the plug member which will face the port 22 of the housing member 12 when the plug member is in the closed position. A sealing ring 50 which is preferably an O-ring seal is disposed within the groove 48 for sealing engagement with the opposed surface of the valve seat 20 of the housing member 12.

Figure 3:
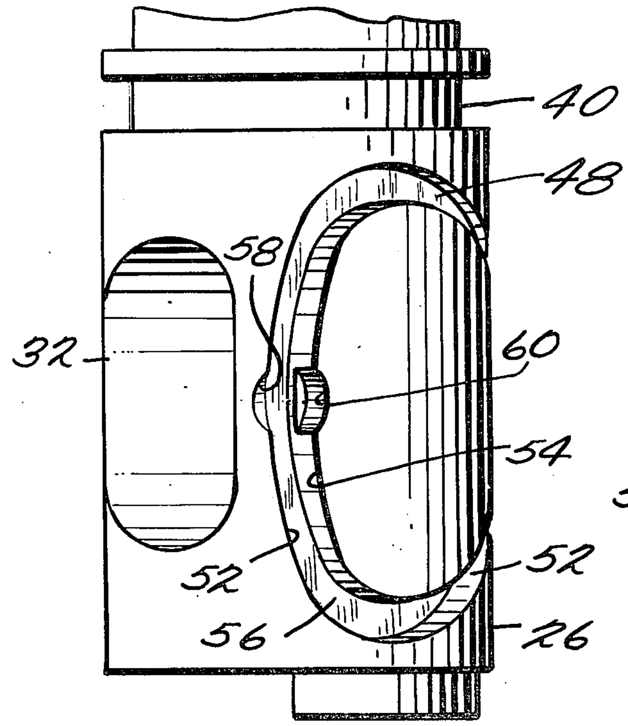
FIG. 3 is an enlarged elevational view of the plug member and illustrating the same without the sealing ring positioned in the groove of the plug member.
Figure 4:
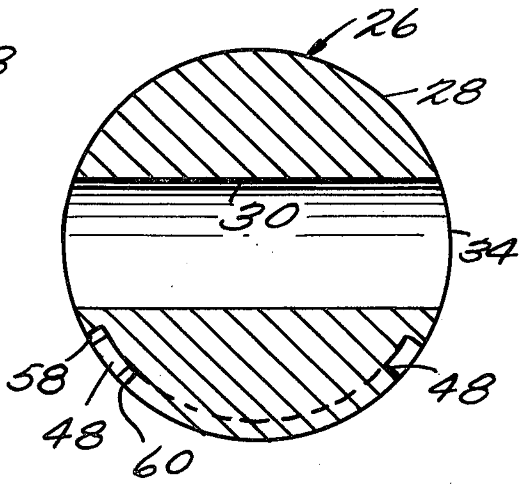
FIG. 4 is a sectional view of the plug member of the valve of FIG. 1, the view being enlarged and taken on the line 4—4 of FIG. 1 and the sealing ring being omitted for purposes of clarity.
Figure 2:
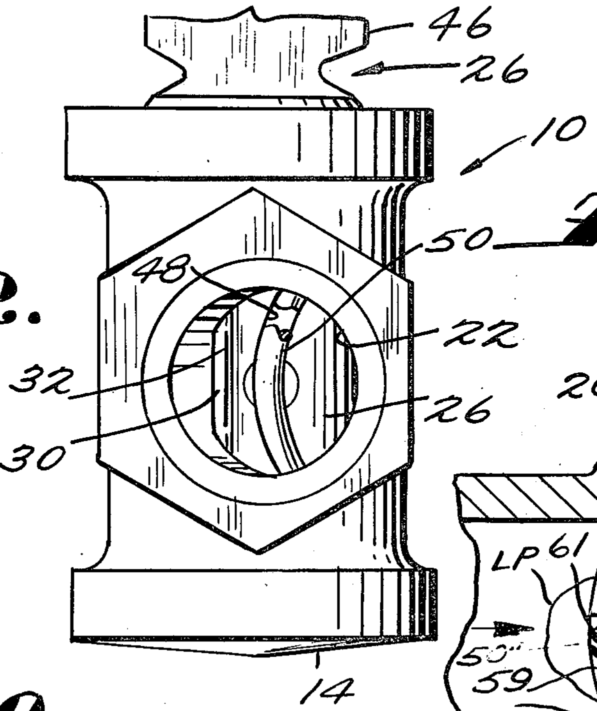
FIG. 2 is an enlarged and elevational view of FIG. 1 looking from the left to the right of the same, but showing the plug member being rotated so that a portion or segment of the sealing ring is passing across a port in the housing of the valve.

Referring now to FIGS. 3 and 4 it will be noted that the endless groove 48 is provided with an outer wall 52, an inner wall 54 spaced therefrom and a bottom wall 56 joining the outer and inner walls. While the groove is shown as generally rectangular in radial cross section, it could be curved or other shaped in radial cross section. The width of the groove between the outer wall 52 and the inner wall 54 is slightly less than the radial width of the sealing ring 50 so that the sealing ring is frictionally retained in the groove. A nominal groove width of 0.003 inches less than the width of the sealing ring is usually used. Of course, the depth of the groove is slightly less than the thickness of the sealing ring since it is necessary for the sealing ring 50 to bear against the seat face 20 in the housing member 12.

As previously mentioned, if the sealing ring is merely mounted in a groove provided on the surface of the plug member, and the sealing ring is arranged to encircle the upstream port of the valve housing member when the valve is in the closed position, a problem exists when the valve is being opened as a low pressure area is created on that portion or segment of the sealing ring crossing the upstream housing port which is approaching the edge of the upstream housing port. This low pressure area and the high pressure in the groove beneath its sealing ring results in a differential pressure across the unsupported portion or segment of the sealing ring tending to pull the portion or segment of the sealing ring out of its groove just prior to its passing the edge of the port in the valve housing member resulting in clipping or shearing of the sealing ring. The situation does not generally occur when the plug member is rotated towards the closed position as the inlet line pressure on the exposed unsupported portion or segment of the sealing ring supplements the frictional forces and resistance to bending of the sealing ring and these cumulative forces are sufficient to maintain the sealing ring seated in its groove as it approaches the edge of the port in the housing member.

Should such a valve member be placed in a fluid line in a reversed manner to that described above and wherein the sealing ring encircles the downstream port of the valve housing membr when the valve is in the closed position, a very unsatisfactory condition results as the O-ring is pulled out of the groove upon closing of the valve and in some instances may even be pulled out of the groove upon opening of the valve. Here again a low pressure condition is created on the exposed unsupported portion or segment of the sealing ring upon closing of the valve and in some instances on opening of the valve resulting in a differential pressure across the sealing ring tending to lift the sealing ring out of its groove.

The present invention obviates the difficulties heretofore mentioned with rotary plug valves having a sealing ring on the plug member in that it results in a rotary plug valve which can be installed in a fluid distribution system in any manner and thus is effectively a two-way valve in that flow can be through the valve in either direction. To accomplish this, the outer and inner walls 52 and 54 respectively of the endless groove 48 for the sealing ring 50 are provided with outer and inner diametrically opposed notches 58 and 60 in that portion or segment of the endless groove 48 which passes across the port 22 of the housing member 12 upon opening and closing of the valve 10. The notches 58 and 60 may extend to the bottom wall 56 of the groove 48 but preferably no deeper than the bottom wall. In some instances the notches 58 and 60 may extend to a depth slightly less than to the bottom wall 56 of the groove 48 so long as they can provide communication with the bottom portion of the sealing ring 50 and the exposed unsupported outer portion of the same. Of course, the notches could extend to a distance greater than the bottom wall 56 of the groove 48 so long as they do not damage the O-ring seating surface, which, in this instance, is the bottom wall 56. Usually the notches are formed by utilizing a shallow pointed or flat end drill slightly wider than the width of the groove 48 but other means of forming the notches may be used. As shown in FIGS. 1 and 3, notch 58 in the outer wall 52 opposes the second notch 60 but of course a plurality of notches 58 could oppose a plurality of notches 60 in the inner and outer walls 52 and 54 of the groove 48 in the portion or segment of the groove 48 which crosses the port 22 when the plug member 26 is rotated between open and closed positions.

Referring now to FIGS. 5 and 6 the rotary plug valve 10 of the present invention is shown installed in a fluid distribution system with the port 22 acting as an upstream port since it is connected to the inlet fluid pressure line 16. Since the arrangement shown in FIGS. 1, 2, 3 and 6 is provided with check means, the plug member 26 can only rotate 90°between a fully-open and fully-closed position and the valve 10 will always have the sealing ring 50 cooperating with the port 22 which in this case is acting as an inlet port. As best shown in FIG. 6 as the rotary plug member 26 approaches the open position, the exposed unsupported portion or segment of the sealing ring 50 crossing the port 22 will be subjected to a low pressure condition as indicated at P. However, the outside notch 58 of the groove 48 which is trailing in reference to the direction of rotation of the plug member 26 provides communications between the bottom and top of the sealing ring 50 and thus reduces the pressure beneath the sealing ring so as to equalize the pressure across the sealing ring. This retains the sealing ring 50 in its groove 48 up and until it passes the edge of the port 22 and is confined by the valve seat 20. Of course, the inside notch 60 is functioning to assist in equalizing the pressure across the sealing ring 50, but it ceases to function once it passes the edge of the port 22 on closing.

If the flow through the valve 12 of FIGS. 5 and 6 is reversed, a situation such as shown in FIGS. 7 and 8 occurs. In this arrangement, the port 22 in the housing member 12 would be connected to the outlet fluid pressure line 18 and thus become a downstream or outlet port whereas the port 24 would be connected to the inlet fluid pressure line 16 and would become the inlet port. Since the plug member 26 can only rotate between defined open and closed positions, the sealing ring 50 would encircle a downstream port when the valve 10 is closed, namely, the port 22 acting as a downstream port. When the valve 10 is installed into a line in this manner, the notch 60 in the wall 54 functions somewhat the same as the notch 58 did as described above to equalize the pressure across the O-ring, but only in this case the notch 60 is the trailing notch during closing in reference to the direction of rotation of the plug member 26. In this respect, as the plug member 26 is being rotated towards the closed position, the fast flow of fluid from the passage 30 of the plug member into the downstream port 22 in the housing member 12 creates a low pressure area P′ around the exposed unsupported portion or segment of the sealing ring 50 crossing the port. The pressure fluid trapped beneath the sealing ring 50 is higher resulting in the differential pressure across the sealing ring. The notch 60 reduces the pressure beneath the sealing ring 50 to equalize the pressure across the plug member 26 and this notch, being the trailing notch will maintain this equalized pressure until the sealing ring is entirely confined in the valve seat 20. The notch 58 which is leading, when referring to the direction of rotation with respect to plug member 26 to close the rotary plug valve, assists the notch 60 in initially reducing the pressure trapped beneath the sealing ring 50, but since it is leading, it is only effective until it passes the edge of the port 22 acting as a downstream port.

The arrangements shown in FIG. 5 and FIG. 7 have been described with respect to the opening and closing respectively of the valve 10 when the valve has its port 22 in the housing member 12 respectively acting as an upstream port and a downstream port. These conditions just described with respect to FIG. 5 and FIG. 7 are the critical conditions of a rotary plug valve having a sealing ring carried in a groove on the surface of the plug member. While there does not seem to be too much of a problem when the valve of FIG. 5 or the valve of FIG. 7 are respectively closed and opened, if a low-pressure condition does occur around the exposed unsupported portion or segment of the sealing ring 50, the provision of notches 58 and 60 in the outer and inner walls 52 and 54 respectively will function to equalize the pressure across the unsupported portion of the sealing ring as described above but with the opposite notch in each situation functioning as the trailing notch for maintaining equalization of pressure across the sealing ring until the sealing ring passes the edge of the port 22.

From the above description it will now be evident the valve illustrated in FIGS. 1 through 7 is truly a two-way flow valve in which the sealing ring 50 is protected from clipping and shearing regardless of whether the sealing ring is crossing the upstream port or the downstream port in the valve housing member. The rotary plug valve 10 may be used in a fluid distribution system in which the flow of fluid is sometimes reversed or it may be used in a fluid distribution system having flow in one direction only. When used in this latter mentioned system, the valve 10 may be installed with the port 22 of the valve housing member 12 functioning as an upstream or a downstream port without any adverse effects on the sealing ring 50 during operation of the valve.

Referring now to FIG. 9, there is disclosed a modified plug 26′ for use in the rotary plug member 10 of FIG. 1. In this respect, the modified plug 26′ has endless groove 48 on its surface between its port openings 32 and 34 (not shown), the groove 48 having an outer wall 52, an inner wall 54, and a bottom wall 56 just like in the plug member 26. Instead of utilizing notches 58 and 60 which are curved in crosssection, a plurality of V-shaped notches 58′ are provided in the outer wall 52 and a plurality of V-shaped notches 60′are provided in the inner wall 54. The notches 58′ are offset with respect to the notches 60′ and while there are more notches 60′ shown in the drawing than notches 58′, the number of notches in the respective outer and inner walls could be the same and if desired they could oppose one another. The plug member 26′ functions identically to the plug member 26 when such a plug member is installed in a rotary plug valve and a further description of the operation of a rotary plug valve having the plug member 26′ is not repeated herein as it would be merely repetitive of the description hereinbefore given.

Referring now to FIGS. 10 through 13 inclusive there is disclosed a plug member 26″ for use with a checkless rotary plug valve 10″. A checkless rotary plug valve is one in which the plug member 26″ is without stop means and may rotate a full 360 degrees and in this respect the plug member is usually provided with a spindle 70 rotatable in a suitable bore in the bottom of the valve housing member and other than this, the plug member 26″ may be substantially identical to the plug member 26 with respect to cooperating with the valve seat 20 in a housing member and to the retaining means for axially retaining the plug member in the housing member.

The plug member 26″ has a passage 30 therethrough with the port openings 32 and 34. On one surface of the plug member 26″ between the port openings 32 and 34 there is provided an endless groove 48″ having an outer wall 52″, an inner wall 54″ and a bottom wall 56″ connecting the same, the endless groove receiving an endless sealing ring 50″ such as an O-ring.

Since the valve 10″ is a checkless rotary plug valve and the plug member 26″ can be rotated in either direction 360°, provisions must be made to take care of situations where either side porion or segment of the sealing ring 50″passes a port in the housing member 12″ and is unsupported regardless of whether the port in functioning as an upstream or inlet port or a downstream or outlet port. In order to satisfy all conditions of operation of the rotary plug valve 10″ it is necessary to provide notches on each of the side portions of the endless groove 48″ which are capable of passing a port opening and carry the side portions of the sealing ring which may be unsupported during operation of the valve.

Figure 10:
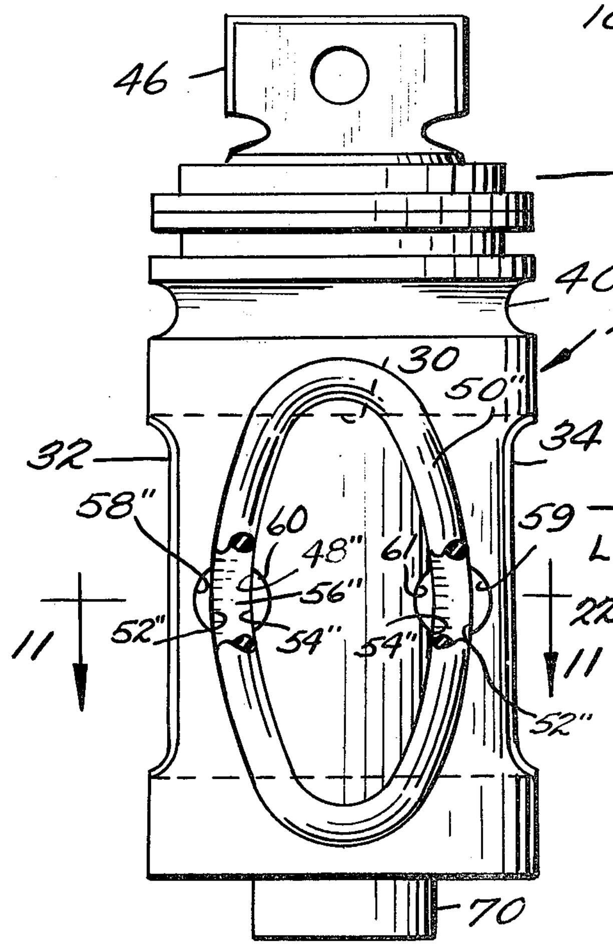
FIG. 10 discloses an elevational view of a still further modified plug member for use in a checkless rotary plug valve wherein the plug member may rotate 360°.

As shown in FIG. 10, the outer wall 52″ on one side portion of the groove 48″ is provided with a notch 58″ preferably extending no greater in depth than to the bottom wall 56″and the inner wall 54″ is provided with an oppositely disposed notch 60″ which preferably extends a depth no greater than to the bottom wall 56″. On the opposite side of the groove 48″a second notch 59 is provided in the outer wall 52″ and a second notch 61 is provided on the inner wall 54″. The notches 58″, 60″, 59 and 61 will function to reduce pressure beneath the sealing ring 50″ and equalize the pressure across the same when, because of the particular direction of rotation of the plug member 26″, a particular one of the notches is acting as a trailing notch.

Figure 12:
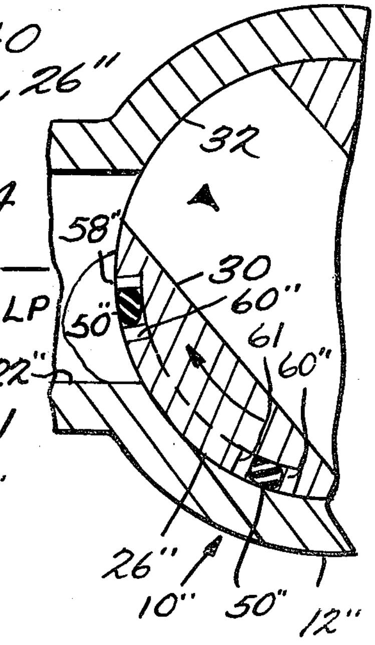
FIG. 12 is a fragmentary sectional view of a rotary plug valve utilizing the plug member of FIG. 10 and illustrating the valve being opened by rotation of the plug member in one direction.

As an example of the operation of the rotary plug valve 10″, reference is now specifically made to FIG. 12 wherein the port 22″ is functioning as an inlet port and the rotary plug member 26″ is being rotated in a counter-clockwise direction from a closed position where the sealing ring 50″ encircles the port 22″. In this situation, as the plug member 26″approaches the full-open position, the flow of fluid from the port 22″ into the passage 30 of the plug member results in a low pressure area LP on the exposed, unsupported surface of the sealing ring 50″. The trailing notch 58″, which is the notch in the outer wall 52″ of the groove 48″, is the last notch to pass beyond the edge of the port opening and it will thus maintain the pressure equalization across the sealing ring 50″ so that the sealing ring is retained in the groove 48″.

Figure 13:
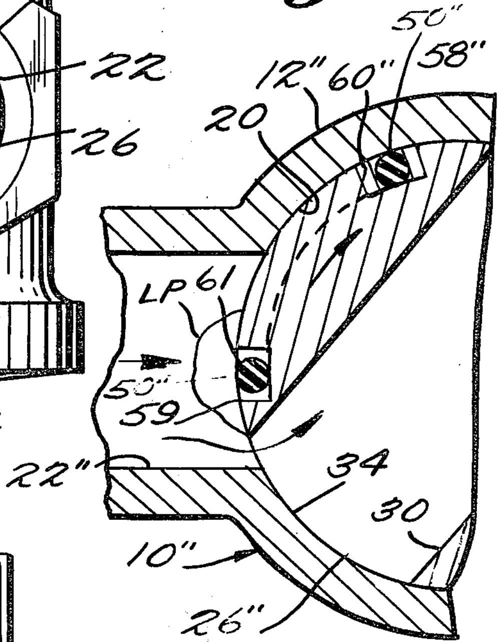
FIG. 13 is a sectional view similar to FIG. 12 with the flow of fluid in the same direction but the valve being opened by rotation of the plug member in the opposite direction.

Referring now to FIG. 13 if the plug member 26″ is rotated clockwise as shown, then the notches 58″ and 60″have no function with regards to retaining the sealing ring in the groove since the valve seat 20 supports this portion of the sealing ring. However, the notch 59 functions just as the notch 58″ functioned in the description of FIG. 12 as the plug member approaches the fully opened position and the low pressure area LP is compensated for by reduction of the pressure beneath the sealing ring 50″.

Assuming the port 22″ is functioning as a downstream port and the flow is the reverse of the flow shown in FIGS. 12 and 13, then the trailing ports 60″ and 61 would be the critical ports upon closing of the valve as they would be the ports for equalizing the pressure across the sealing ring 50″. It will now be seen that the checkless rotary plug valve 10″ may have its plug member 26″ rotated in any direction to open and close the same and regardless of what direction the plug member is rotated, the sealing ring 50″is protected against lifting out of its groove 48″ and being clipped or sheared by an edge of a port which it is passing.

FIG. 14 discloses a modified plug member 26‴ for use with a checkless rotary plug valve such as the plug valve 10″ of FIGS. 12 and 13. In this modification of the invention, the endless groove 48‴ provided on the surface of the plug member 26‴ between its port openings 32 and 34 has an outer wall 52‴ and an inner wall 54‴ and a bottom wall 56‴. Instead of utilizing a single notch 58″ and 59 on opposite sides of the outer side wall 52″, the plug member 26‴ is provided with a plurality of notches 58‴and 59‴ on the opposite sides of the outer side wall 52‴ of the groove 48‴. Likewise the inner wall 54‴ is provided with a plurality of notches 60‴ on one side of the same and a further plurality of notches 61‴ on the other side of the same. The operation of a checkless rotary plug valve with the plug member 26′ of FIG. 14 will be substantially identical to the operation of the checkless rotary plug valve shown in FIGS. 10–13 inclusive and heretofore described.

FIG. 15 represents a further plug member 26⁗for a checkless rotary plug valve such as 10″, the view illustrating utilization of a plurality of V-shaped notches 58⁗ and 59⁗ in the outer wall 52⁗ of the groove 48⁗and a plurality of V-shaped notches 60⁗ and 61⁗ in the inner wall 54⁗. The plug member 26⁗ will function in a checkless rotary plug valve such as 10″ in the identical manner as the plug member 26″ (FIG. 10) and 26‴ (FIG. 14).

The terminology used in this specification is for the purposes of description and not limitation, the scope of the invention being defined in the claims.

What is claimed is:

1. A rotary plug valve capable of having fluid flow therethrough in either direction, said plug valve comprising:

a housing member having a valve seat provided with at least a first port and a second port, a plug member rotatable in said valve seat and having a flow passage therethrough with at least a first port opening and a second port opening, said plug member being rotatable between a fully opened position wherein said first and second port openings of the flow passage of said plug are in register with the first and second ports of said housing and a fully closed position, said plug member having an endless groove on its surface between said at least first and second port openings of the same, said groove having an inner wall, an outer wall, and a bottom wall therebetween, a resilient sealing ring carried in said groove and arranged to encircle and form a seal around at least one of said first and second ports of said housing member when said plug member is in the closed position a first, means in said outer wall of said groove for equalizing pressure across said sealing ring as said sealing ring passes across at least one of said ports in said housing when the one said port is an inlet port and said plug member approaches said fully opened position, and a second means in said inner wall of said groove for equalizing pressure across said sealing ring as said sealing ring passes across at least one of said ports in said housing when the one said port is an outlet port and said plug member approaches said fully closed position.

2. A rotary plug valve as claimed in claim 1 in which said first means for equalizing pressure across said sealing ring comprises at least one notch extending downwardly in said outer wall from the surface of said plug member and in which said second means for equalizing pressure across said sealing ring comprises at least one notch extending downwardly in said inner wall of said groove from the surface of said plug member.

3. A rotary plug valve as claimed in claim 2 including means to limit rotation of said plug between said fully open and said fully closed positions and said notches in said outer wall and said inner wall are on a side of the endless groove which crosses the at least one of said ports in said housing.

4. A rotary plug valve as claimed in claim 3 in which there is a plurality of said notches in said outer wall and a plurality of said notches in said inner wall.

5. A rotary plug valve as claimed in claim 3 in which said notches in said outer wall and said inner wall are part circular in cross section.

6. A rotary plug valve as claimed in claim 3 in which said notches, said outer wall, and said inner wall are V-shaped in cross section.

7. A rotary plug valve as claimed in claim 2 in which said endless groove is rectangular in cross section and said sealing ring is an O-ring.

8. A rotary plug valve as claimed in claim 2 in which said notches extend from the surface of said plug member to a distance no greater than the bottom wall of the groove.

9. A rotary plug valve as claimed in claim 2 in which said plug valve is without stop means and said plug member may rotate 360°, and when the plug valve is in the closed position, there is at least one notch in the outer wall of said groove on each side of the port which the groove encircles and there is at least one notch in the inner wall of said groove on each side of the port which the groove encircles.

10. A rotary plug valve as claimed in claim 9 in which there is a plurality of notches in the outer wall of said groove on each side of the port which the groove encircles and there is a plurality of notches in the inner wall of said groove on each side of the port which the groove encircles.

11. A rotary plug valve as claimed in claim 9 in which said notches in said outer wall and said inner wall are part circular in cross section.

12. A rotary plug valve as claimed in claim 9 in which said notches in said outer wall and said inner wall are V-shaped in cross section.

13. A rotary plug valve as claimed in claim 9 in which said endless groove is rectangular in cross section and said sealing ring is an O-ring.

14. A rotary plug valve comprising:

a housing member having a valve seat provided with at least a first port and a second port, a plug member having a flow passage therethrough, said plug member being rotatable in said valve seat to align the passage therethrough with said ports in a fully opened positiion and move said passage out of alignment with said ports in a closed position, said plug member having an endless groove on its surface with an endless sealing ring therein, said sealing ring being arranged to encircle and form a seal around one of said ports in said housing member when said plug member is in the closed position, said groove having an inner wall, an outer wall, and a bottom wall, at least a segment of said groove with said sealing ring therein being movable across at least one of said ports when said plug member is rotated between opened and closed positions, said segment of said groove having at least one notch in the outer wall of the groove and at least one notch in the inner wall of the groove, each of said notches extending downwardly from the surface of the plug member.

15. A rotary plug valve as claimed in claim 14 in which the at least said notch in the outer wall is opposite the at least said notch in the inner wall.

16. A rotary plug valve as claimed in claim 15 in which the at least said notch in the outer wall and the at least said notch in the inner wall are part circular in cross section.

17. A rotary plug valve as claimed in claim 14 including check means to limit rotation of said plug member between the fully open and the closed positions.

18. A rotary plug valve as claimed in claim 14 in which there is a plurality of notches in said outer wall of said at least one segment and a plurality of notches in said inner wall of said at least one segment.

19. A rotary plug vlave as claimed in claim 18 in which said notches in said outer wall are offset with respect to said notches in said inner wall.

20. A rotary plug valve as claimed in claim 19 in which said notches in said outer wall and said inner wall are V-shaped in cross section.

21. A rotary plug valve as claimed in claim 14 in which said plug member is without stop means and may rotate 360° and in which opposed segments of said groove with said sealing ring therein are movable across either of said ports in said housing, the outer wall and inner wall of each segment having at least one notch therein.

22. A rotary plug valve as claimed in claim 14 in which said notches extend from the surface of said plug member to a distance no greater than the bottom wall of the groove.

* * * * *